US012788665B2

(12) United States Patent
Bae

(10) Patent No.: US 12,788,665 B2
(45) Date of Patent: Nov. 10, 2026

(54) EXERCISE ASSISTANCE APPARATUS INCLUDING MAGNET

(71) Applicant: Samsung Electronics Co., Ltd., Suwon-si (KR)

(72) Inventor: Kuemjong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 18/634,118

(22) Filed: Apr. 12, 2024

(65) Prior Publication Data

US 2024/0252380 A1 Aug. 1, 2024

Related U.S. Application Data

(63) Continuation of application No. PCT/KR2022/013089, filed on Sep. 1, 2022.

(30) Foreign Application Priority Data

Oct. 13, 2021 (KR) ........................ 10-2021-0135698
Jul. 8, 2022 (KR) ........................ 10-2022-0084329

(51) Int. Cl.
*A61H 3/00* (2006.01)
*A61H 1/02* (2006.01)

(52) U.S. Cl.
CPC ............ *A61H 3/00* (2013.01); *A61H 1/0244* (2013.01); *A61H 1/0281* (2013.01);
(Continued)

(58) Field of Classification Search
CPC ...... A61H 3/00; A61H 1/0244; A61H 1/0281; A61H 2201/0107; A61H 2201/1215;
(Continued)

(56) References Cited

U.S. PATENT DOCUMENTS 6,424,070 B1 7/2002 Spano
8,631,542 B2 1/2014 Chen
(Continued)

FOREIGN PATENT DOCUMENTS

CN 207049186 U 2/2018
CN 110151502 A 8/2019
(Continued)

OTHER PUBLICATIONS

International Search Report for PCT/KR2022/013089 mailed Dec. 16, 2022, 5 pages.
(Continued)

*Primary Examiner* — Madison Matthews
(74) *Attorney, Agent, or Firm* — Nixon & Vanderhye P.C.

(57) ABSTRACT

An exercise assistance apparatus may include: a proximal support for supporting a proximal part of a user; a distal support for supporting a distal part (e.g., thigh or arm) of the user; and actuator that is connected to the proximal support and generates power; an upper frame connected to the actuator; a lower frame connected to the distal support; a base link connected to a first of the upper frame or the lower frame; a frame link which is connected to the other of the upper frame or the lower frame and detachably connected to the base link, and can rotate about the base link; and a magnet that is connected to the base link and exerts magnetic force to the frame link.

15 Claims, 8 Drawing Sheets

(52) U.S. Cl.
CPC ................ *A61H 2201/0107* (2013.01); *A61H 2201/1215* (2013.01); *A61H 2201/165* (2013.01); *A61H 2201/1676* (2013.01)

(58) Field of Classification Search
CPC ...... A61H 2201/165; A61H 2201/1676; A61H 1/024; A61H 1/02; B25J 9/00; B25J 9/10; B25J 9/12; B25J 15/02; H01F 7/00
USPC ............................................................... 601/5
See application file for complete search history.

(56) References Cited

U.S. PATENT DOCUMENTS

| | | | | |
|---|---|---|---|---|
| 2012/0204380 | A1 | 8/2012 | Chen | |
| 2015/0313786 | A1* | 11/2015 | Sano | A61H 3/00 602/16 |
| 2018/0325764 | A1* | 11/2018 | Yagi | B25J 9/0006 |
| 2021/0031561 | A1 | 2/2021 | Langenfeld | |
| 2021/0128390 | A1* | 5/2021 | Choi | A61H 1/0244 |

FOREIGN PATENT DOCUMENTS

| | | | |
|---|---|---|---|
| JP | 2011156354 | A | 8/2011 |
| KR | 20190055598 | A | 5/2019 |
| KR | 20210053389 | A | 5/2021 |
| WO | 03078772 | A1 | 9/2003 |
| WO | 2007126210 | A1 | 11/2007 |

OTHER PUBLICATIONS

Written Opinion of the ISA for PCT/KR2022/013089 mailed Dec. 16, 2022, 4 pages.

* cited by examiner

EXERCISE ASSISTANCE APPARATUS INCLUDING MAGNET

CROSS-REFERENCE TO RELATED APPLICATIONS

This application is a continuation application of International Application No. PCT/KR2022/013089 designating the United States, filed on Sep. 1, 2022, in the Korean Intellectual Property Receiving Office and claiming priority to Korean Patent Application No. 10-2021-0135698, filed on Oct. 13, 2021, and Korean Patent Application No. 10-2022-0084329, filed on Jul. 8, 2022, in the Korean Intellectual Property Office, the disclosures of which are all hereby incorporated by reference herein in their entireties.

BACKGROUND

Field

The following description relates to an exercise assistance apparatus including at least one magnet.

Description of Related Art

In a rapidly aging society, a growing number of people are complaining of joint-related inconvenience and pain. Accordingly, there is an increased interest in an assistance apparatus for assisting the elderly, or for patients having joint problems in walking with ease. An exercise assistance apparatus may also be worn to increase muscular strength of a certain body part.

SUMMARY

An exercise assistance apparatus according to an example embodiment may include a proximal support configured to support a proximal part of a user, a distal support configured to support a distal part of the user, an actuator (comprising at least one of a motor and/or a gear) connected, directly or indirectly, to the proximal support and configured to generate power, an upper frame connected, directly or indirectly, to the actuator, a lower frame connected, directly or indirectly, to the distal support, a base link connected, directly or indirectly, to one frame among the upper frame and the lower frame, a frame link that is connected, directly or indirectly, to the other frame among the upper frame and the lower frame, detachably connected, directly or indirectly, to the base link, and rotatable with respect to the base link, and at least one magnet connected, directly or indirectly, to the base link and configured to apply magnetic force to the frame link.

An exercise assistance apparatus according to an example embodiment may include an actuator configured to generate power, an upper frame connected, directly or indirectly, to the actuator, a lower frame provided in a position spaced apart from the upper frame, a base link connected, directly or indirectly, to one frame among the upper frame and the lower frame, a frame link including a frame plate connected, directly or indirectly, to the other frame among the upper frame and the lower frame, a frame body configured to extend from the frame plate and provided between at least the upper frame and the lower frame, and a hook configured to extend from the frame body, provided on an opposite side of the frame plate with respect to the frame body, and configured to accommodate at least a portion of the base link, and at least one magnet configured to apply magnetic force to the frame link.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
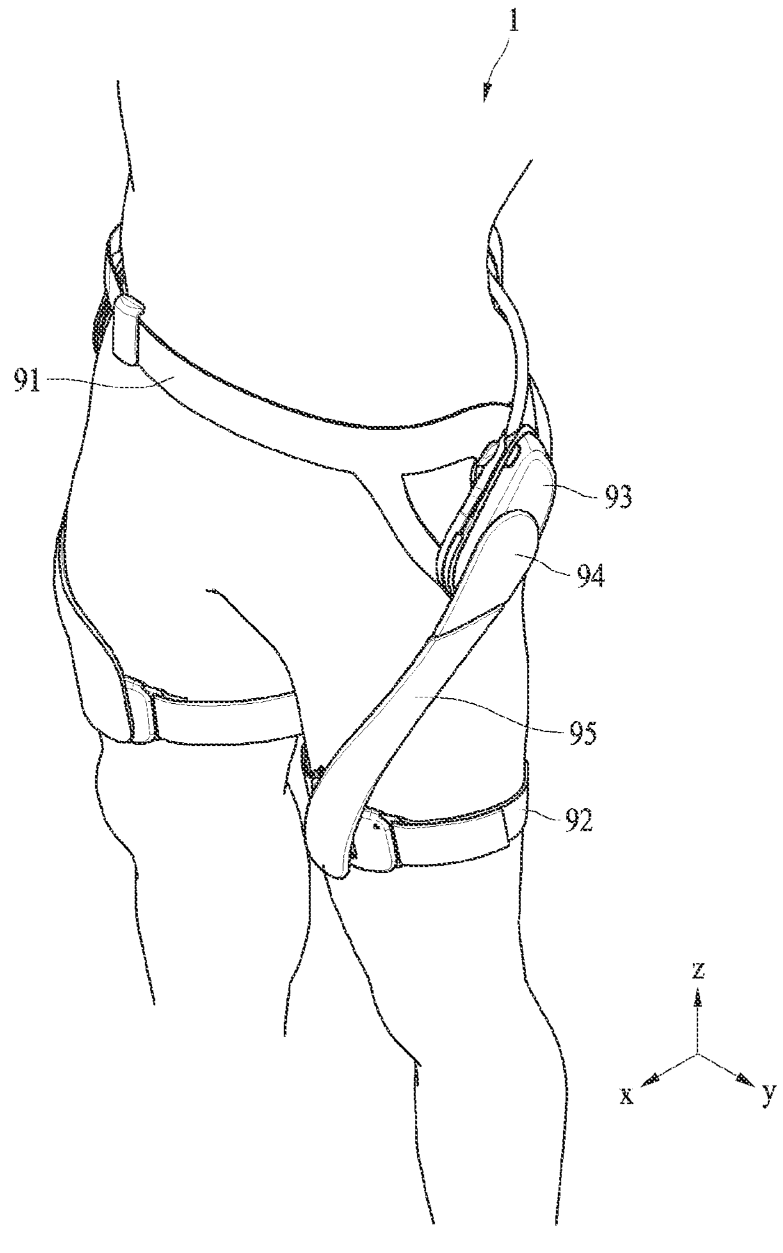
FIG. 1 is a perspective view illustrating a user wearing an exercise assistance apparatus according to an example embodiment.

Hereinafter, embodiments are described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It should be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical or scientific terms used herein have the same meaning as those commonly understood by one of ordinary skill in the art to which the examples belong. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the embodiments with reference to the accompanying drawings, like reference numerals refer to like components and a repeated description related thereto is omitted. In the description of embodiments, detailed description of well-known related structures or functions is omitted when it is deemed that such description may cause ambiguous interpretation of the present disclosure.

In addition, in the description of the components of the embodiments, terms such as first, second, A, B, (a), (b), and the like may be used. These terms are used only for the purpose of discriminating one component from another component, and the nature, the sequences, the orders, or the like of the components are not limited by the terms. It is to be understood that if a component is described as being "connected," "coupled," or "joined" to another component, the former may be directly "connected," "coupled," or "joined" to the latter or "connected," "coupled," or "joined" to the latter via at least another component(s).

"On" as used herein covers both directly on, and indirectly on with other element(s) therebetween. The same name may be used to describe components having a common function in different embodiments. Unless otherwise mentioned, the description of one embodiment may be applicable to any other embodiment(s). Thus, duplicated description is omitted for conciseness.

Figure 2:
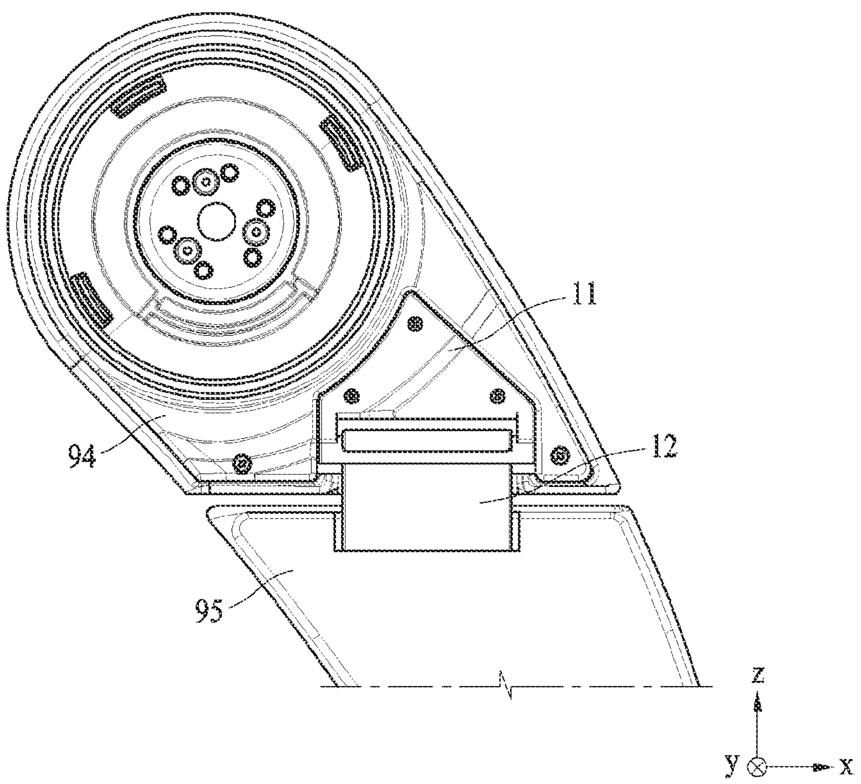
FIG. 2 is a side view illustrating an upper frame, a lower frame, a base link, and a frame link according to an example embodiment.
Figure 3:
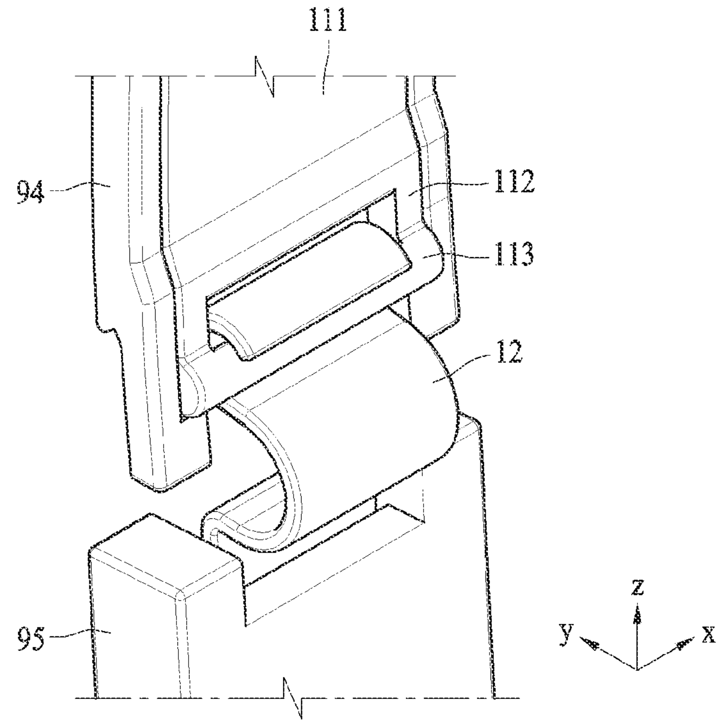
FIG. 3 is a perspective view illustrating a shaft supporting the frame link according to an example embodiment.
Figure 4:
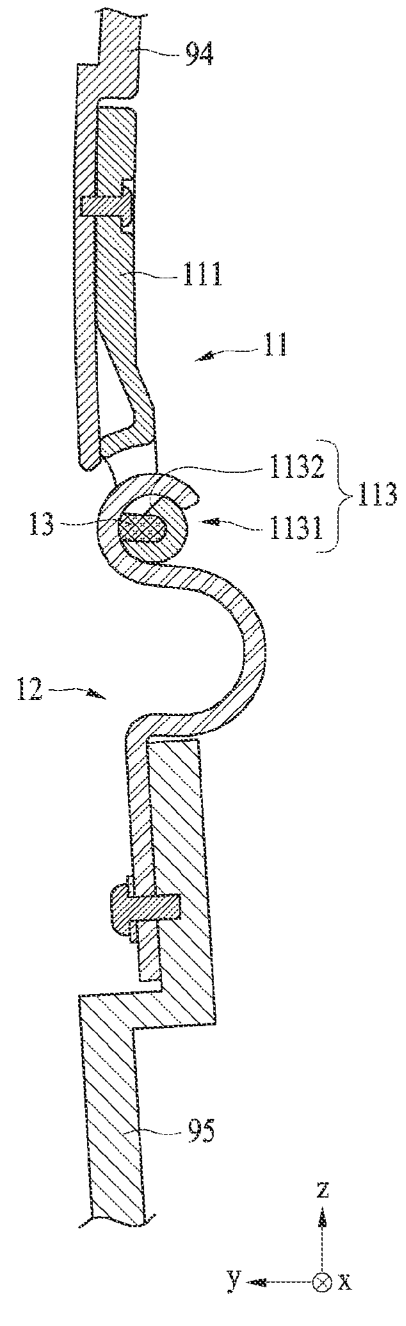
FIG. 4 is a cross-sectional view illustrating the upper frame, the lower frame, the base link, the frame link, and a magnet according to an example embodiment.

FIG. 1 is a perspective view illustrating a user wearing an exercise assistance apparatus according to an embodiment, FIG. 2 is a side view illustrating an upper frame, a lower frame, a base link, and a frame link according to an embodiment, FIG. 3 is a perspective view illustrating a shaft supporting the frame link according to an embodiment, and FIG. 4 is a cross-sectional view illustrating the upper frame, the lower frame, the base link, the frame link, and a magnet according to an embodiment.

Referring to FIGS. 1 to 4, an exercise assistance apparatus 1 may be worn by a user and assist the motion of the user. The user may be a human, an animal, a robot, and the like, but is not limited thereto. The exercise assistance apparatus 1 may assist a motion of some upper or lower body joints of the user. For example, the exercise assistance apparatus 1 may assist the motion of the lower body of the user by assisting a motion of at least one of a hip joint, a knee joint, and an ankle joint of the user. For example, the exercise assistance apparatus 1 may assist the motion of the upper body of the user by assisting a motion of at least one of a shoulder joint, an elbow joint, and a wrist joint of the user. The exercise assistance apparatus 1 may assist the user in walking by assisting the motion of some lower body joints of the user. Hereinafter, the description is provided on the exercise assistance apparatus 1 assisting the user in walking by assisting the motion of the hip joint of the user. However, a wearing part and a target joint of the exercise assistance apparatus 1 are not limited thereto. The exercise assistance apparatus 1 may include a proximal support 91, a distal support 92, an actuator 93, an upper frame 94, a lower frame 95, a base link 11, a frame link 12, and at least one magnet 13.

In an embodiment, the proximal support 91 and the distal support 92 may be disposed opposite to each other based on one body part of the user and may respectively support a proximal part and a distal part of the user. For example, the proximal support 91 may support a waist and/or pelvis and the like of the user and the distal support 92 may support a thigh, knee, calf, and/or foot, and the like of the user. The proximal support 91 may include a detachable belt for supporting the waist of the user all around. The distal support 92 may include a detachable belt for supporting the thigh of the user all around.

In another example, the proximal support 91 and the distal support 92 may be disposed opposite to each other based on an upper arm of the user. The proximal support 91 may support, for example, a shoulder and/or back and the like and the distal support 92 may support, for example, a forearm and the like. For example, the proximal support 91 may include a detachable belt for supporting the shoulder of the user all around and the distal support 92 may include a detachable belt for supporting the forearm of the user all around or a structure wrapping all around the forearm of the user.

In an embodiment, the proximal support 91 and the distal support 92 may move relative to each other on a sagittal plane. For example, when the user does the motion of flexion or extension of the hip joint while wearing the exercise assistance apparatus 1, the distal support 92 may rotate relative to the proximal support 91 on the sagittal plane.

In an embodiment, the proximal support 91 and the distal support 92 may move relative to each other on a frontal plane. For example, when the user does the motion of adduction or abduction of the hip joint while wearing the motion assistance apparatus 1, the distal support 92 may rotate relative to the proximal support 91 on the frontal plane.

In an embodiment, the lower frame 95 and the distal support 92 may move relative to each other on a transverse plane. For example, when the user rotates the thigh while wearing the exercise assistance apparatus 1, the distal support 92 may rotate together with the thigh in a state in close contact with the thigh. The distal support 92 may rotate relative to the lower frame 95. In this structure, the wearing comfort of the exercise assistance apparatus 1 may be improved.

In an embodiment, the actuator 93 may be connected, directly or indirectly, to the proximal support 91 and may generate power. The actuator 93 may include, for example, a motor and a speed reducer. The motor may include at least one of a brush motor, a brushless motor, or a stepping motor. The motor may include at least one of an induction motor or a synchronous motor. The speed reducer may include, for example, a gear train.

In an embodiment, the upper frame 94 and the lower frame 95 may transmit power generated by the actuator 93 to the distal support 92. For example, the upper frame 94 and the lower frame 95 may assist a movement of the hip joint of the user. The upper frame 94 may be detachably connected, directly or indirectly, to the actuator 93. For example, the upper frame 94 may be coupled, directly or indirectly, to the outer surface of the actuator 93. The lower frame 95 may be rotatably connected, directly or indirectly, to the upper frame 94 and may be connected, directly or indirectly, to the distal support 92. The lower frame 95 may have a shape configured for covering a portion of the distal part of the user. For example, the lower frame 95 may cover a portion of the thigh of the user. The length of the lower frame 95 may be greater than the length of the upper frame 94.

In an embodiment, when an output terminal of the actuator 93 rotates in one direction, the upper frame 94 and the lower frame 95 may receive power from the actuator 93 and transmit the power to the distal support 92 to assist the flexion motion of the hip joint of the user. For example, when the output terminal of the actuator 93 rotates clockwise, the upper frame 94 and the lower frame 95 may assist the flexion motion of the hip joint of the user.

In an embodiment, when the output terminal of the actuator 93 rotates in an opposite direction to the one direction, the upper frame 94 and the lower frame 95 may receive power from the actuator 93 and transmit the power to the distal support 92 to assist the extension motion of the hip joint of the user. For example, when the output terminal of the actuator 93 rotates counterclockwise, the upper frame 94 and the lower frame 95 may assist the extension motion of the hip joint of the user.

It should be noted that, although the upper frame 94 and the lower frame 95 are described as assisting the motion of the hip joint of the user in an embodiment, functions of the upper frame 94 and the lower frame 95 are not limited thereto. For example, when the exercise assistance apparatus 1 is used to assist a movement of the upper body joints of the user, the upper frame 94 and the lower frame 95 may assist the motion of the shoulder or elbow joint of the user.

In an embodiment, the upper frame 94 and the lower frame 95 may be rotatably connected, directly or indirectly, to each other. For example, the upper frame 94 and the lower frame 95 may be rotatably connected to each other by the base link 11 and the frame link 12. The base link 11 may be connected to one frame among the upper frame 94 and the lower frame 95. For example, as shown in FIG. 2, the base link 11 may be connected to the upper frame 94. The frame link 12 may be connected to the other frame among the upper frame 94 and the lower frame 95. For example, as shown in FIG. 2, the frame link 12 may be connected to the lower frame 95. Hereinafter, description is provided on an embodiment in which the base link 11 is connected to the upper frame 94 and the frame link 12 is connected to the lower frame 95. The base link 11 may have a rotation axis on which the upper frame 94 and the lower frame 95 may rotate. The rotation axis of the base link 11 may have a cylindrical shape such as a shaft or a round bar. The rotation axis of the base link 11 may be parallel to the x-axis.

In an embodiment, the frame link 12 may be connected, directly or indirectly, to the lower frame 95. The frame link 12 may be detachably connected, directly or indirectly, to the base link 11. The frame link 12 may rotate with respect to the base link 11 while remaining in surface contact with the component of the base link 11 having a cylindrical shape. The lower frame 95 may rotate with respect to the upper frame 94. A rotation direction of the lower frame 95 may be a direction away from the body or a direction toward the body. Here, the direction away from the body may be a +y direction, and the direction toward the body may be a −y direction. A rotation direction away from the body may be clockwise, and a rotation direction toward the body may be counterclockwise.

In an embodiment, the magnet 13 may be connected, directly or indirectly, to the base link 11 and may apply magnetic force to the frame link 12. The magnet 13 may be located between at least the base link 11 and the frame link 12. For example, the magnet 13 may be located on the rotation axis of the base link 11. The magnet 13 may have only one pole. For example, the magnet 13 may be a unipolar electromagnet. The magnet 13 may not apply magnetic force to the base link 11. The base link 11 may be formed of a material that does not stick to a magnet, such as aluminum. The magnet 13 may apply magnetic force to the frame link 12. The magnetic force may be an attractive force. The frame link 12 may be formed of a material that sticks to a magnet, such as SUS430.

In an embodiment, the magnet 13 may apply an attractive force to the frame link 12 while the frame link 12 rotates. The frame link 12 may maintain a state in contact with the magnet 13 or the base link 11 covering the magnet 13. The rotation axis of the frame link 12 may remain constant while the frame link 12 rotates.

In an embodiment, the frame link 12 may not be separated from the base link 11. In the event of a sudden rotation of the lower frame 95, such as the user walking on a steep slope, the distal support 92 may not be separated from the proximal support 91. The distal part of the user may be supported and protected by the distal support 92. The base link 11 may include a base plate 111, a shaft arm 112, a shaft 113, and a link hole 114.

In an embodiment, the base plate 111 may be detachably connected, directly or indirectly, to the upper frame 94. For example, the base plate 111 may be screwed to the upper frame 94. The base plate 111 may be connected to a surface of the upper frame 94 facing the body of the user. The shaft arm 112 may be formed to extend from the base plate 111 toward the lower frame 95. The shaft arm 112 may be provided as a pair of parallel shaft arms. The shaft arm 112 may support the shaft 113.

In an embodiment, the shaft 113 may be formed to extend from the shaft arm 112 in a direction parallel to the rotation axis of the frame link 12. At least a portion of the shaft 113 may have a cylindrical shape. The shaft 113 may support the frame link 12. The frame link 12 may rotate in a state in surface contact with the shaft 113. The shaft 113 may include the link hole 114. The link hole 114 may be formed to be recessed in the shaft 113 and may accommodate the magnet 13. The magnet 13 may be detachably accommodated in the link hole 114.

In an embodiment, the base link 11 may have a hole surrounded by the base plate 111, the shaft arm 112, and the shaft 113. A space may exist between the shaft 113 and the base plate 111. At least a portion of the frame link 12 may pass through the hole during rotation. At least a portion of the frame link 12 may be located between the base plate 111 and the shaft 113. The frame link 12 may not be in contact with the base plate 111 while rotating. An angle at which the frame link 12 may rotate may increase. The shaft 113 may include a guide surface 1131 and a cutting surface 1132.

In an embodiment, the guide surface 1131 may be provided in a state in surface contact with the frame link 12. The guide surface 1131 may have a shape of a curved surface. For example, the guide surface 1131 may have a partial shape of a cylinder. The guide surface 1131 may guide a rotational motion of the frame link 12. The cutting side 1132 may be provided in a state spaced apart from the frame link 12. The cutting surface 1132 may not be in contact with the frame link 12. The link hole 114 may be formed on the cutting surface 1132.

Figure 5:
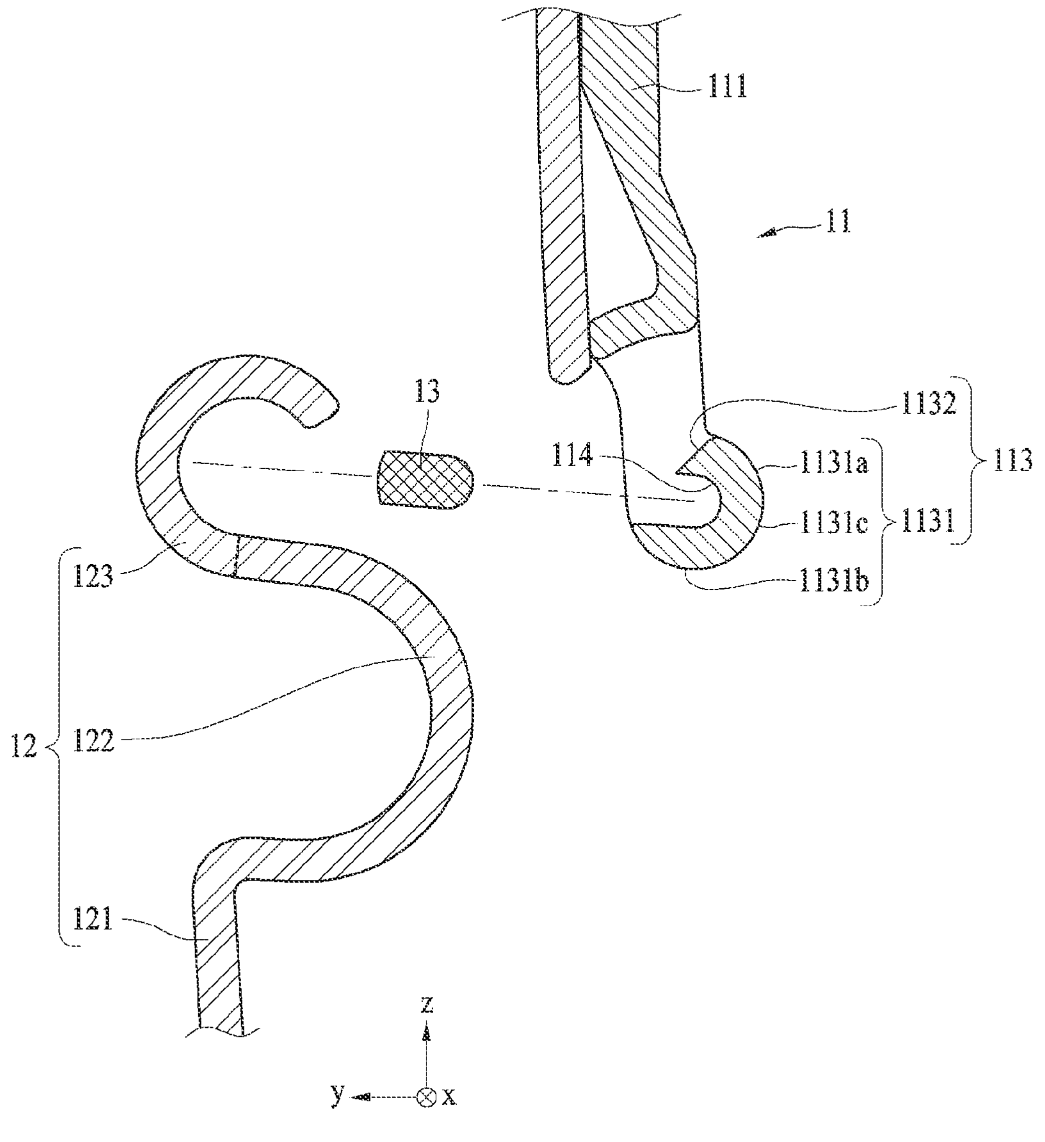
FIG. 5 is a cross-sectional view illustrating a base link, a frame link, and a magnet according to an example embodiment.
Figure 6:
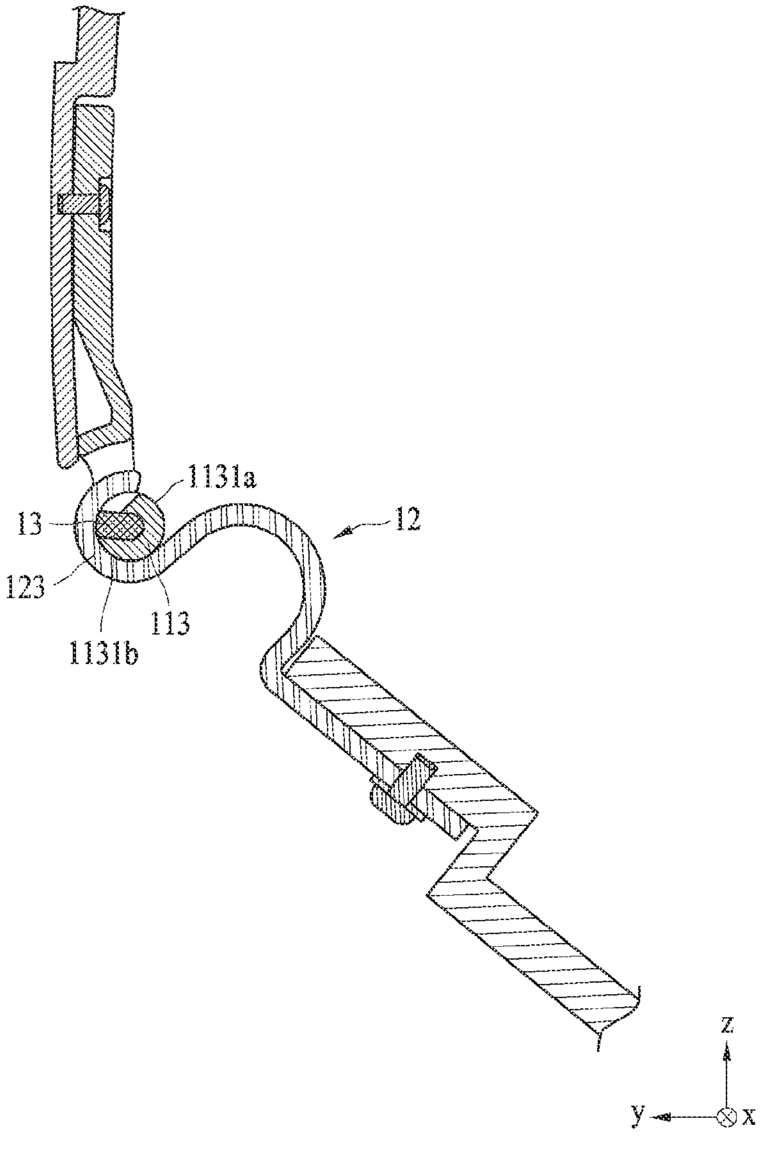
FIG. 6 is a cross-sectional view illustrating the rotation of the frame link according to an example embodiment.

FIG. 5 is a cross-sectional view illustrating a base link, a frame link, and a magnet according to an embodiment, and FIG. 6 is a cross-sectional view illustrating the rotation of the frame link according to an embodiment.

Referring to FIGS. 5 and 6, the frame link 12 according to an embodiment may include a frame plate 121, a frame body 122, and a hook 123. In an embodiment, the frame plate 121 may be detachably connected to a lower frame. For example, the frame plate 121 may be screwed to the lower frame. The frame body 122 may be formed to extend from the frame plate 121 and provided between an upper frame and the lower frame. The frame body 122 may have a shape of a curved surface. The frame body 122 may space the upper frame and the lower frame apart. Depending on the degree of bending of the frame body 122, an interval between the upper frame and the lower frame may vary.

In an embodiment, when a rotation angle of the lower frame increases counterclockwise, the frame body 122 may have contact with the base link 11, and the frame link 12 may no longer rotate counterclockwise. The lower frame may not be in contact with the upper frame. Damage or wear to the lower frame and the upper frame may be reduced.

In an embodiment, the hook 123 may be formed to extend from the frame body 122. The hook 123 may be provided on an opposite side of the frame plate 121 with respect to the frame body 122. The hook 123 may accommodate the shaft 113. The hook 123 may have a shape that surrounds the shaft 113. For example, the hook 123 and the frame body 122 may have an S-shape as a whole. One end of the hook 123 may pass through a space between the base plate 111 and the shaft 113. The guide surface 1131 may be in surface contact with the hook 123. The curvature of an inner surface of the hook 123 in contact with the guide surface 1131 may be equal to or less than the curvature of the guide surface 1131. The hook 123 may rotate in a state in surface contact with the guide surface 1131. The guide surface 1131 may include a first contact part 1131*a*, a second contact part 1131*b*, and an exposed part 1131*c*.

In an embodiment, the first contact part 1131*a* may support a portion of the frame link 12 that passes through the space between the base plate 111 and the shaft 113. The second contact part 1131*b* may be provided on an opposite side of the first contact part 1131*a* with respect to the link hole 114 and may support the frame link 12. The exposed part 1131*c* may be provided between the first contact part 1131*a* and the second contact part 1131*b* and may not be in contact with the hook 123. In a state in which the upper frame and the lower frame are connected side by side, the first contact part 1131*a* and the second contact part 1131*b* may be in contact with the hook 123. The frame link 12 may be supported by the first contact part 1131*a* and the second contact part 1131*b*.

In an embodiment, the magnet 13 may remain accommodated in the link hole 114 while the frame link 12 rotates. The rotation axis of the frame link 12 may be kept constant by magnetic force. When the frame link 12 rotates counterclockwise by more than a set angle, the first contact part 1131*a* may not be in contact with the hook 123. In a state in which the hook 123 is spaced apart from the first contact part 1131*a*, the second contact part 1131*b* may remain in contact with the hook 123 by magnetic force.

In an embodiment, when the frame link 12 rotates clockwise by more than a set angle, the second contact part 1131*b* may not be in contact with the hook 123. In a state in which the frame link 12 is spaced apart from the second contact part 1131*b*, the first contact part 1131*a* may remain in contact with the hook 123 by magnetic force.

In an embodiment, when the frame link 12 rotates clockwise, one end of the hook 123 may not be in contact with the cutting surface 1132. The frame link 12 may continuously rotate clockwise. Damage to the base link 11 and the frame link 12 caused by one end of the hook 123 coming into contact with the cutting surface 1132 may be reduced. Safe operation of an exercise assistance apparatus may be possible.

Figure 7:
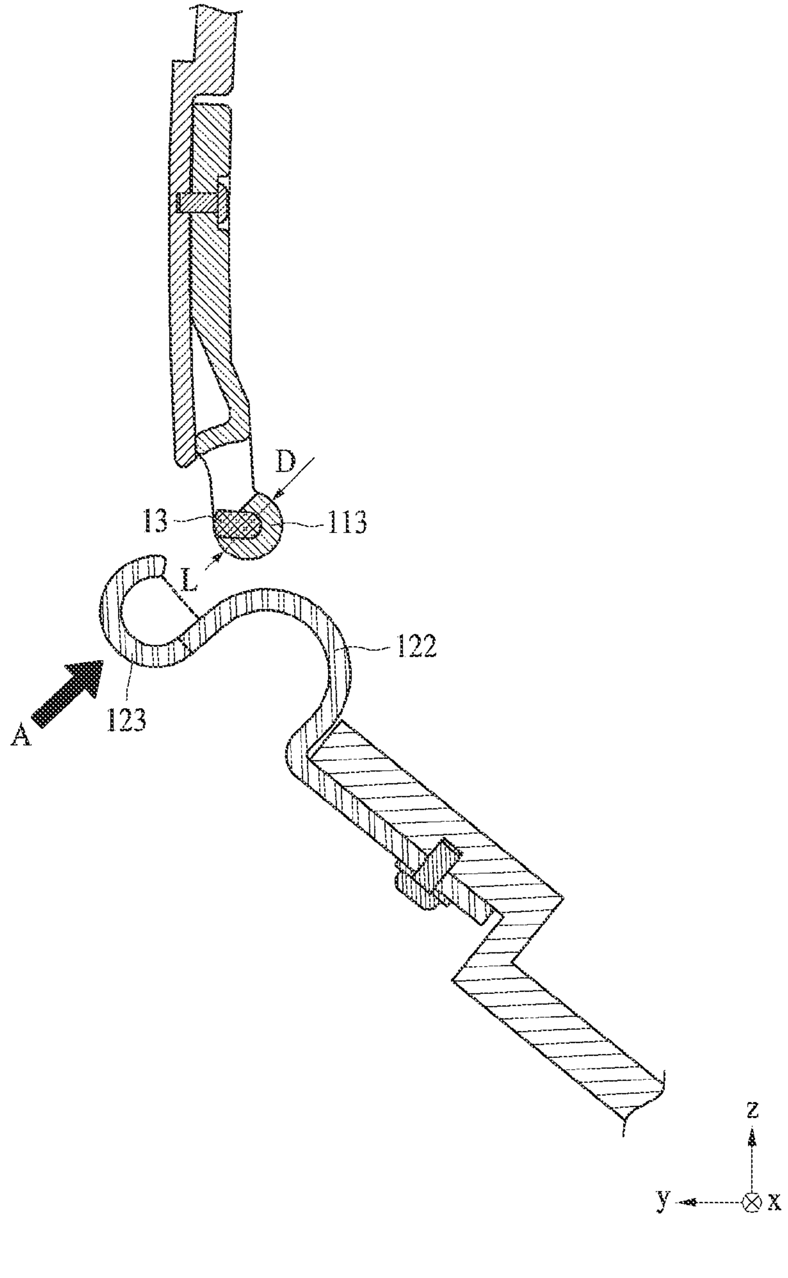
FIG. 7 is a cross-sectional view illustrating a base link separated from a frame link, according to an example embodiment.

FIG. 7 is a cross-sectional view illustrating a base link separated from a frame link, according to an embodiment.

Referring to FIG. 7, the base link according to an embodiment may be detachably connected to the frame link. The minimum distance L from one end of the hook 123 to the frame body 122 may be less than the diameter D of the shaft 113. The one end of the hook 123 may be a part that passes through the space between a base plate and the shaft 113. In a state in which a first contact part and a second contact part support the hook 123, the shaft 113 may not be separated through a space between the frame body 122 and one end of the hook 123.

In an embodiment, in a state in which the hook 123 is spaced apart from the first contact part, the shaft 113 and the magnet 13 may be separated from original positions thereof through a space between the frame body 122 and the one end of the hook 123. For example, the user may apply force to the base link in a direction A. The applied force may be greater than an attractive force between the magnet 13 and the hook 123. The base link may be detached from the frame link without modification of the structure of the hook 123. When the magnet 13 is damaged or worn, the base link may be detached from the frame link to replace the magnet 13. The shaft 113 of the detached base link may pass between the frame body 122 and the one end of the hook 123. The base link may be reconnected to the frame link.

The structure of the base link and the frame link including a magnet is not limited to being placed between an upper frame and a lower frame connecting the proximal part and the distal part of the user. In an embodiment, the structure may be placed between components capable of a relative rotational motion in an exercise assistance apparatus.

Figure 8:
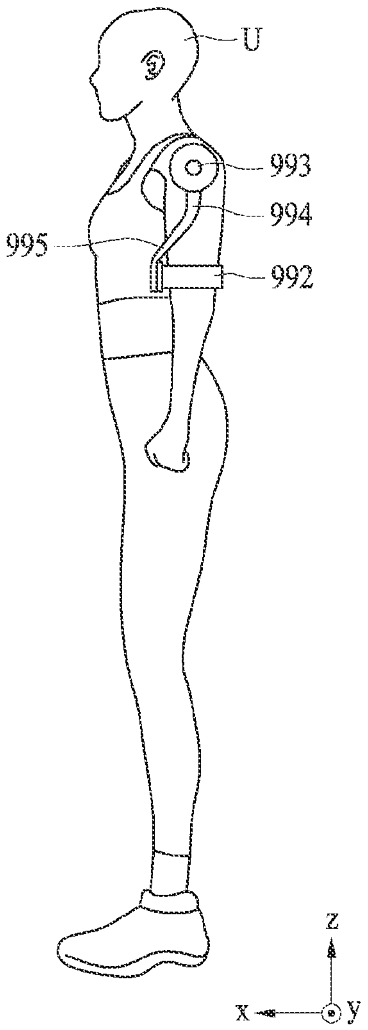
FIG. 8 is a side view illustrating an exercise assistance apparatus worn on an upper arm of a user, according to an example embodiment.

FIG. 8 is a side view illustrating an exercise assistance apparatus worn on an upper arm of a user, according to an embodiment.

Referring to FIG. 8, the exercise assistance apparatus may be mounted on, directly or indirectly, an upper arm of a user U. For example, a distal support 992 of the exercise assistance apparatus may wrap around and support a forearm of the user U all around. An actuator 993 may be positioned around a shoulder of the user U. An upper frame 994 may be connected to the actuator 993. A lower frame 995 may be connected to the upper frame 994 and placed along the upper arm of the user U.

An exercise assistance apparatus according to an embodiment may include a proximal support configured to support a proximal part of a user, a distal support configured to support a distal part of the user, an actuator, comprising at least one of a motor and/or a gear, connected to the proximal support and configured to generate power, an upper frame connected to the actuator, a lower frame connected to the distal support, a base link connected to one frame among the upper frame and the lower frame, a frame link that is connected to the other frame among the upper frame and the lower frame, detachably connected to the base link, and rotatable with respect to the base link, and a magnet connected to the base link and configured to apply magnetic force to the frame link.

In an embodiment, the base link may include a base plate detachably connected to the one frame, a shaft arm formed to extend from the base plate toward the other frame, a shaft formed to extend from the shaft arm in a direction parallel to a rotation axis of the frame link, and a link hole formed to be recessed in the shaft and configured to accommodate the magnet.

In an embodiment, at least a portion of the frame link may be located between the base plate and the shaft.

In an embodiment, the shaft may include a guide surface provided in a state in surface contact with the frame link and a cutting surface provided in a state spaced apart from the frame link.

In an embodiment, the guide surface may include a first contact part capable of supporting a portion of the frame link that passes through a space between the base plate and the shaft and a second contact part provided on an opposite side of the first contact part with respect to the link hole and capable of supporting the frame link.

In an embodiment, the guide surface may include an exposed part that is provided between the first contact part and the second contact part and that is not in contact with the frame link.

In an embodiment, in a state in which the frame link is spaced apart from one contact part among the first contact part and the second contact part, the other contact part among the first contact part and the second contact part may remain in surface contact with the frame link by the magnetic force of the magnet.

In an embodiment, the frame link may include a frame plate detachably connected to the other frame, a frame body formed to extend from the frame plate and provided between the upper frame and the lower frame, and a hook formed to extend from the frame body, provided on an opposite side of the frame plate with respect to the frame body, and configured to accommodate the shaft.

In an embodiment, the guide surface may be in surface contact with the hook.

In an embodiment, a minimum distance from one end of the hook to the frame body may be less than a diameter of the shaft.

In an embodiment, in a state in which the frame link is spaced apart from the first contact part, the shaft and the magnet may be capable of being separated from original positions thereof through a space between one end of the hook and the frame body.

In an embodiment, the magnet may be located between the base link and the frame link.

An exercise assistance apparatus according to an embodiment may include an actuator configured to generate power, an upper frame connected to the actuator, a lower frame provided in a position spaced apart from the upper frame, a base link connected to one frame among the upper frame and the lower frame, a frame link including a frame plate connected to the other frame among the upper frame and the lower frame, a frame body formed to extend from the frame plate and provided between the upper frame and the lower frame, and a hook formed to extend from the frame body, provided on an opposite side of the frame plate with respect to the frame body, and configured to accommodate at least a portion of the base link, and a magnet configured to apply magnetic force to the frame link.

In an embodiment, the base link may include a base plate detachably connected to the one frame, a shaft arm formed to extend from the base plate toward the other frame, a shaft formed to extend from the shaft arm in a direction parallel to a rotation axis of the frame link and configured to support the frame link, and a link hole formed to be recessed in the shaft and configured to accommodate the magnet.

In an embodiment, the shaft may include a guide surface provided in a state in surface contact with the frame link and a cutting surface provided in a state spaced apart from the frame link.

In an embodiment, the guide surface may include a first contact part capable of supporting a portion of the frame link that passes through a space between the base plate and the shaft and a second contact part provided on an opposite side of the first contact part with respect to the link hole and capable of supporting the frame link.

In an embodiment, in a state in which the frame link is spaced apart from one contact part among the first contact part and the second contact part, the other contact part among the first contact part and the second contact part may remain in surface contact with the frame link by the magnetic force of the magnet.

While the embodiments are described with reference to a limited number of drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order and/or if components in a described system, architecture, device, or circuit are combined in a different manner and/or replaced or supplemented by other components or their equivalents. It will also be understood that any of the embodiment(s) described herein may be used in conjunction with any other embodiment(s) described herein.

Therefore, other implementations, other embodiments, and equivalents to the claims are also within the scope of the following claims.

The invention claimed is:

1. A wearable exercise assistance apparatus comprising: a proximal support configured to support a proximal part of a user; a distal support configured to support a distal part of the user; an actuator, comprising a motor and/or a gear, connected to the proximal support and configured to generate power; an upper frame connected to the actuator; a lower frame connected to the distal support; a base link connected to a first frame among the upper frame and the lower frame; a frame link that is connected to the other frame among the upper frame and the lower frame, detachably connected to the base link, and rotatable with respect to the base link; and a magnet connected to the base link and configured to apply magnetic force to the frame link, wherein the base link comprises: a base plate detachably connected to the first frame; a shaft arm configured to extend from the base plate toward the other frame; a shaft configured to extend from the shaft arm in a direction substantially parallel to a rotation axis of the frame link; and a link hole configured to be recessed in the shaft and configured to accommodate the magnet.

2. The exercise assistance apparatus of claim 1, wherein at least a portion of the frame link is located between at least the base plate and the shaft.

3. The exercise assistance apparatus of claim 1, wherein the shaft comprises: a guide surface configured to be in surface contact with the frame link; and a cutting surface configured to be spaced apart from the frame link.

4. The exercise assistance apparatus of claim 3, wherein the guide surface comprises:

a first contact part configured to support a portion of the frame link that passes through a space between at least the base plate and the shaft; and a second contact part provided on an opposite side of the first contact part with respect to the link hole and configured to support the frame link.

5. The exercise assistance apparatus of claim 4, wherein the guide surface comprises:

an exposed part that is provided between at least the first contact part and the second contact part and that is not in contact with the frame link.

6. The exercise assistance apparatus of claim 4, wherein, in a state in which the frame link is spaced apart from a contact part among the first contact part and the second contact part, the other contact part among the first contact part and the second contact part remains in surface contact with the frame link at least via magnetic force of the magnet.

7. The exercise assistance apparatus of claim 5, wherein the frame link comprises:

a frame plate detachably connected to the other frame;

a frame body configured to extend from the frame plate and provided between at least the upper frame and the lower frame; and a hook configured to extend from the frame body, provided on an opposite side of the frame plate with respect to the frame body, and configured to accommodate the shaft.

8. The exercise assistance apparatus of claim 7, wherein the guide surface is configured to be in surface contact with the hook.

9. The exercise assistance apparatus of claim 7, wherein a minimum distance from one end of the hook to the frame body is less than a diameter of the shaft.

10. The exercise assistance apparatus of claim 7, wherein, in a state in which the frame link is spaced apart from the first contact part, the shaft and the magnet are capable of being separated from original positions thereof through a space between at least an end of the hook and the frame body.

11. The exercise assistance apparatus of claim 1, wherein the magnet is located between at least the base link and the frame link, and wherein the distal part of the user is a thigh or arm of the user.

12. An exercise assistance apparatus comprising: an actuator, comprising a motor and/or a gear, configured to generate power; an upper frame connected to the actuator; a lower frame provided in a position spaced apart from the upper frame; a base link connected to a first frame among the upper frame and the lower frame; a frame link comprising: a frame plate connected to the other frame among the upper frame and the lower frame; a frame body configured to extend from the frame plate and provided between at least the upper frame and the lower frame; and a hook configured to extend from the frame body, provided on an opposite side of the frame plate with respect to the frame body, and configured to accommodate at least a portion of the base link; and a magnet configured to apply magnetic force to the frame link, wherein the base link comprises: a base plate detachably connected to the first frame; a shaft arm configured to extend from the base plate toward the other frame; a shaft configured to extend from the shaft arm in a direction parallel to a rotation axis of the frame link and configured to support the frame link; and a link hole configured to be recessed in the shaft and configured to accommodate the magnet.

13. The exercise assistance apparatus of claim 3, wherein the shaft comprises: a guide surface configured to be in surface contact with the frame link; and a cutting surface configured to be spaced apart from the frame link.

14. The exercise assistance apparatus of claim 13, wherein the guide surface comprises:

a first contact part configured to support a portion of the frame link that passes through a space between at least the base plate and the shaft; and a second contact part provided on an opposite side of the first contact part with respect to the link hole and capable of supporting the frame link.

15. The exercise assistance apparatus of claim 14, wherein, in a state in which the frame link is spaced apart from a contact part among the first contact part and the second contact part, the other contact part among the first contact part and the second contact part is configured to remain in surface contact with the frame link at least via magnetic force of the magnet.

* * * * *